United States Patent
Berghöfer (10) Patent No.: US 12,325,446 B2
(45) Date of Patent: Jun. 10, 2025

(54) APPARATUS AND METHOD FOR MONITORING THE STABILITY OF AN EGO VEHICLE

(71) Applicant: Continental Automotive GmbH, Hannover (DE)

(72) Inventor: Yannick Berghöfer, Frankfurt am Main (DE)

(73) Assignee: Continental Autonomous Mobility Germany GmbH, Ingolstadt (DE)

( * ) Notice: Subject to any disclaimer, the term of this patent is extended or adjusted under 35 U.S.C. 154(b) by 0 days.

(21) Appl. No.: 17/658,251

(22) Filed: Apr. 6, 2022

(65) Prior Publication Data

US 2022/0324486 A1 Oct. 13, 2022

(30) Foreign Application Priority Data

Apr. 7, 2021 (DE) .................. 10 2021 203 428.4

(51) Int. Cl.
*B60W 60/00* (2020.01)
*B60W 40/09* (2012.01)
*B60W 40/114* (2012.01)

(52) U.S. Cl.
CPC ........ *B60W 60/0015* (2020.02); *B60W 40/09* (2013.01); *B60W 40/114* (2013.01); *B60W 2300/14* (2013.01); *B60W 2540/229* (2020.02); *B60W 2552/53* (2020.02); *B60W 2554/4045* (2020.02)

(58) Field of Classification Search
CPC ............. B60W 60/0015; B60W 40/09; B60W 40/114; B60W 2552/53; B60W 2540/229; B60W 2554/4045; B60W 2300/14
See application file for complete search history.

(56) References Cited

U.S. PATENT DOCUMENTS

| | | | | |
|---|---|---|---|---|
| 2006/0076741 | A1* | 4/2006 | Lim | B60T 8/17554 280/5.508 |
| 2009/0319112 | A1* | 12/2009 | Fregene | B60W 30/16 701/25 |
| 2019/0213429 | A1* | 7/2019 | Sicconi | G06F 3/012 |

FOREIGN PATENT DOCUMENTS

| | | | | |
|---|---|---|---|---|
| DE | 102007043912 | A1 | 3/2009 | |
| DE | 102011002911 | A1 * | 7/2012 | ............... B60T 7/22 |
| DE | 102017011570 | A1 | 9/2018 | |

(Continued)

OTHER PUBLICATIONS

DE-102018002513-A1 translation (Year: 2018).*

(Continued)

*Primary Examiner* — Mahmoud S Ismail
*Assistant Examiner* — Gabriel Anfinrud (57) ABSTRACT

The present disclosure relates to an apparatus for monitoring the stability of an ego vehicle, including at least a first and a second driver assistance device, the at least first and second driver assistance device being designed to guide the ego vehicle; an evaluation unit which is designed to determine a degree of risk of a detected and/or anticipated pendulum motion of the ego vehicle. An assessment unit is further included, the assessment unit being designed to assess, on the basis of the determined degree of risk, whether the at least first and/or second driver assistance device in an active state will lead to pendulum initiation or pendulum intensification of the ego vehicle.

19 Claims, 3 Drawing Sheets

(56) References Cited

FOREIGN PATENT DOCUMENTS

DE 102018002513 A1 * 9/2018
DE 102017126884 A1 * 5/2019

OTHER PUBLICATIONS

DE-102011002911-A1 translation (Year: 2011).*
DE-102017126884-A1 translation (Year: 2017).*
German Office Action dated Nov. 24, 2021 for the counterpart German Patent Application No. 10 2021 203 428.4.

* cited by examiner

APPARATUS AND METHOD FOR MONITORING THE STABILITY OF AN EGO VEHICLE

CROSS REFERENCE TO RELATED APPLICATION

This application claims priority to German Application 10 2021 203 428.4, filed Apr. 7, 2021. The disclosures of the above application is incorporated herein by reference.

FIELD OF INVENTION

The invention relates to an apparatus and a method for monitoring the stability of an ego vehicle. Furthermore, the invention relates to a vehicle comprising an apparatus of this kind.

BACKGROUND

Modern vehicles such as passenger cars, trucks, motorized two-wheeled vehicles or other means of transportation known from the prior art are increasingly being equipped with driver assistance systems which can detect the surroundings using suitable sensor technology or sensor systems, recognize traffic situations and assist the driver. Radar sensors, lidar sensors, camera sensors, ultrasound sensors or the like are regularly used as sensor systems for capturing the surroundings. Conclusions regarding the surroundings can subsequently be drawn from the sensor data determined by the sensors. These conclusions can then be used to implement driver assistance functions of the type in question. For example, lateral driver assistance functions such as lane support systems (LSS) actively intervene in the steering system of the ego vehicle to assist the driver in daily driving conditions and prevent dangerous driving situations such as unintentional lane departure.

Driver assistance systems implement a specific driving task that does not always match, or even contradicts, the task of other driver assistance systems. For example, a lane keeping assist system is designed to continuously guide the ego vehicle so as to be centered in the lane, whereas an emergency steering assist (ESA) system is designed, for example, to perform an evasive maneuver. The increasing automation of driving tasks can thus influence the guidance and stability behavior of the vehicle. In particular, rocking of the vehicle can lead to uncontrollable destabilization and, in the worst case, result in a traffic accident; thus, this accident risk requires special handling.

SUMMARY

With this in mind, the object of the present disclosure is to provide an apparatus and a method which reduce the risk of vehicle instability influenced by an increasing degree of automation in the guidance of the ego vehicle.

The aforementioned object is achieved by the whole of the teaching of Claim 1 as well as the additional independent claims. Expedient embodiments are claimed in the dependent claims.

Proposed is an apparatus for monitoring the stability of an ego vehicle, in particular a vehicle-trailer combination. The apparatus comprises at least a first and a second driver assistance device, at least a third or more driver assistance devices. The at least first and second driver assistance devices are designed to perform automated guidance of the ego vehicle, in particular the vehicle-trailer combination. In particular, a vehicle-trailer combination is a towing vehicle, for example a passenger car or truck having at least one trailer attached. In this context, automated guidance is understood in particular to mean partially or fully automated assistance for the vehicle driver, or alternatively autonomous driving. Possible driver assistance devices are, for example, a lane guidance assist system, an adaptive cruise control system or a traffic jam assist system, by means of which the motor vehicle can be guided in a partially automated or fully automated manner. Stability monitoring is understood in particular to mean monitoring the lateral driving behavior of the ego vehicle, in particular the vehicle-trailer combination. For example, unstable lateral driving behavior is detected when unusual vehicle or environmental situations are present, such as rapid steering movements, a small angle between the longitudinal axis of the towing vehicle and the vehicle trailer, and/or rapid angular changes in the longitudinal axes of the towing vehicle and vehicle trailer.

The apparatus comprises an evaluation unit which is designed to determine a degree of a detected and/or anticipated pendulum motion of the ego vehicle, in particular the vehicle-trailer combination. Thus, the determination of a current state of pendulum motion and/or a prediction of the development of pendulum motion is carried out. When determining the degree of the risk, consideration is given in particular to phenomena that directly or indirectly influence the pendulum motion of the ego vehicle. The degree of risk is determined, for example, by detecting an increase in rocking over a specified period of time from an abrupt lateral swinging movement and/or by means of detected wind conditions. The degree of risk can, for example, be defined in different levels, purely by way of example: "no risk", "low risk", "high risk" or even a numerical gradation, for example between 0 and 10, where 0 represents the lowest risk and 10 represents the highest risk.

The apparatus comprises an assessment unit, the assessment unit being designed to assess, on the basis of the determined degree of risk, whether the at least first and/or second driver assistance device in an active state will lead to pendulum initiation or pendulum intensification of the ego vehicle. The active state is understood in particular to mean the operation of the automated guidance by the at least first and/or second driver assistance device. In particular, imminent pendulum initiation or pendulum intensification is detected by the assessment unit if the determined degree of risk exceeds an assigned, defined threshold.

The determination of the degree of risk takes into account factors negatively influencing the pendulum behavior and accordingly assesses timely and reliably whether automated guidance of the ego vehicle by the active or to-be-activated driver assistance devices is safe to perform. In this way, the risk of instability due to an initial onset and further development of pendulum motion of a vehicle, in particular a vehicle-trailer combination, is reduced. Furthermore, it is possible, for example, to avoid shutting down the automated guidance system as has previously been standard when coupling a trailer, thus increasing the overall availability of partially or fully automated driver assistance devices, for example for trailers. The safety and comfort for the vehicle occupants is improved by a decision being made on the basis of the situation as to whether the guidance of the ego vehicle, in particular the vehicle-trailer combination, can be performed safely by at least the first and/or second driver assistance device.

According to an example embodiment, the assessment unit is designed to deactivate or suppress the at least first and/or second driver assistance device if the determined degree of risk exceeds a preset threshold. Preferably, the preset threshold is determined, for example, on the basis of the ego vehicle speed in such a way that, when the threshold is exceeded, a pendulum motion by the ego vehicle, in particular the vehicle-trailer combination, would no longer be compensated for or even intensified by a lateral driver assistance device.

The determination of the degree of risk is based on assessed factors influencing the pendulum motion of the ego vehicle, a weighting factor being assigned to each of the factors influencing the degree of risk. In particular, the evaluation unit is designed to perform a weighted combination of the assessed influencing factors in order to determine the degree of risk.

According to a further development, at least the first and second driver assistance devices each form an influencing factor for determining the degree of risk. The execution of a driving task by a driver assistance device can, under certain circumstances, for example during an evasive maneuver in a curve with a trailer loaded on one side, lead to pendulum initiation or pendulum intensification of the ego vehicle. Thus, consideration of driver assistance devices as influencing factors makes a significant contribution to situation prediction and maneuver planning and thus to stability improvement.

The driver assistance devices allow safety and comfort to be increased, but with the plurality of available driver assistance devices, controlled guidance behavior of the ego vehicle also becomes increasingly complex. The driver assistance devices can have a significant impact on the stability of the ego vehicle, in particular in the case of conflicting driving tasks, different prioritization or different activation times. In order to be able to avoid instability in spite of the increasing complexity, different weighting factors are assigned to the at least one and second driver assistance devices as influencing factors. In particular, the first driver assistance device, which in this context has a greater influence on the stability behavior of the ego vehicle than the second driver assistance device in performing driving tasks, has a higher weighting factor than the second driver assistance device. This classification ensures product safety and also enables situation-adapted guidance of the ego vehicle in a reliable, efficient manner.

In aspect, the first driver assistance device is a lateral safety-based driver assistance device, in particular a collision avoidance protection device for preventing collisions with obstacles and/or a lane departure protection device for preventing departure from the lane or road, in particular an emergency steering assist system. The second driver assistance device is a comfort-based driver assistance device, in particular an adaptive cruise control system, a parking assist system, a lane keeping assist system or a lane guidance assist system, or alternatively a longitudinal safety-based driver assistance device, in particular an emergency brake assist system. From a physical point of view, a lateral safety-based driver assistance device has a higher risk of destabilizing the ego vehicle than the comfort-based driver assistance device in performing driving tasks. By classifying safety-based and comfort-based driver assistance devices, potential destabilization of the ego vehicle can be reliably determined.

According to an example embodiment, if a traffic risk is determined, the assessment unit is designed to deactivate the at least one comfort-based driver assistance device in the activated state and to activate the at least one lateral safety-based driver assistance device if the at least one lateral safety-based driver assistance device can minimize the determined traffic risk. The determined traffic risk is, for example, a risk of collision with an obstacle or imminent lane departure. The traffic risk is assessed by the assessment unit, for example, by means of sensor data from a vehicle sensor. Furthermore, the assessment unit is designed to suppress the activation of the lateral safety-based driver assistance device and/or the deactivation of the comfort-based driver assistance device in spite of a determined traffic risk if the resulting degree of risk exceeds a defined threshold in the case of an activated lateral safety-based driver assistance device. In this way, if there is a risk of an accident, the at least one lateral safety-based driver assistance device can be activated over the at least one comfort-based driver assistance device if the assessed degree of risk does not exceed the specified threshold. Thus, functional transition is possible even if the vehicle is unstable, but the instability sufficiently minor to be acceptable. At the same time, it is ensured, in particular by means of the weighting factors, that the risk of vehicle instability, initiated or intensified by the activation of the lateral safety-based driver assistance device, is prevented. Consequently, the best possible automated assistance is assessed taking into account the environmental and vehicle conditions. For example, it is conceivable that, if a collision is imminent and there is a risk of instability at the same time, the emergency steering assist system remains deactivated but the emergency brake assist system is activated such that instability of the vehicle is prevented and a collision avoidance measure is also initiated.

Various vehicle and environmental conditions can cause the vehicle to bounce dangerously. For example, a coupled vehicle trailer usually has a considerable influence on the driving behavior of the towing vehicle. In particular, a vehicle trailer that is not loaded entirely correctly or external environmental conditions such as crosswinds can cause the vehicle and trailer structure to sway. With this in mind, a particularly pertinent embodiment provides that the evaluation unit is designed to determine the degree of risk of the imminent pendulum initiation or pendulum intensification on the basis of a trailer operation status, trailer characteristics, a currently detected vibration level of the coupled trailer and/or a loaded state of the coupled trailer.

Alternatively or optionally in addition, the evaluation unit is designed to determine the degree of risk of the imminent pendulum initiation or pendulum intensification on the basis of driver alertness. Driver alertness can be determined, for example, by observing the driver using a vehicle interior camera and/or by means of hands-on/hands-off detection on the steering wheel.

Alternatively or optionally in addition, the evaluation unit is designed to determine the degree of risk on the basis of precipitation conditions, wind conditions, visibility conditions, a coefficient of friction, the course of the lane ahead, the speed of the vehicle and/or a planned ego trajectory. The environmental conditions are detected, for example, by means of a sensor unit such as a radar, lidar and/or camera sensor unit, alternatively or optionally additionally by means of a communication unit, e.g. by means of car-to-car or car-to-x communication.

According to a particularly pertinent embodiment, the apparatus comprises a pendulum monitoring unit which is designed to detect a degree of severity of a pendulum motion of the ego vehicle, the assessment unit being designed to perform the assessment of pendulum initiation or pendulum intensification in the case of an activated state of the at least first and/or second driver assistance device additionally on the basis of the detected degree of severity. The degree of severity is determined in particular on the basis of physical vehicle or vehicle-trailer combination characteristics, for example on the basis of the lateral oscillation frequency of the ego vehicle or vehicle-trailer combination, the angular position of the longitudinal axes of the towing vehicle and trailer and/or the angular rate of change between the longitudinal axes of the towing vehicle and trailer. Thus, when determining the degree of severity, visible phenomena in particular are recorded, specifically pendulum motion that can be measured by sensors. The degree of severity of the pendulum motion can be detected, in particular measured, for example, by means of camera data from an in-vehicle camera unit or by means of vehicle dynamics sensors.

According to an example embodiment, the apparatus comprises a neural network that is designed to determine the influencing factors and/or the weighting of the influencing factors. Thus, the influencing factors and/or the weighting thereof are determined in particular on the basis of training data. On the basis of the training data, which was determined, for example, in different traffic situations, the same or similar decisions can be made in the same or similar traffic situations.

As an example alternative, the influencing factors and/or the weighting of the influencing factors are defined by a rule set, the rule set in particular defining the conditions under which and the weighting with which the pendulum behavior is influenced. In this way, various safety-critical traffic scenarios can be reliably displayed.

For example, the apparatus comprises a user interface which is designed to inform the driver of imminent deactivation or non-availability of the at least one lateral driver assistance device for automated lateral guidance if the activation or activity thereof will lead to pendulum initiation or pendulum intensification of the ego vehicle, in particular to the degree-of-risk threshold being exceeded. For example, an availability indicator located in the ego vehicle can be used to symbolize the non-availability or deactivation of automated guidance.

In particular, the apparatus can comprise a microcontroller or processor, a central processing unit (CPU), a graphics processing unit (GPU), a digital signal processor (DSP), an ASIC (Application Specific Integrated Circuit), an FPGA (Field Programmable Gate Array) and the like, as well as software for carrying out the corresponding method steps.

The example embodiments can thus be implemented in digital electronic circuits, computer hardware, firmware or software.

The present disclosure further relate to a vehicle comprising an apparatus according to the preceding description.

The present disclosure further relates to a method for monitoring the stability of an ego vehicle, comprising the following steps: determining a degree of risk of a detected and/or anticipated pendulum motion of the ego vehicle, and assessing, on the basis of the determined degree of risk, whether activation and/or activity of at least a first and/or second driver assistance device of the ego vehicle will lead to pendulum initiation or pendulum intensification of the ego vehicle.

Further features, advantages and effects of the invention are set out in the following description of example embodiments of the invention.

DETAILED DESCRIPTION

Figure 1:
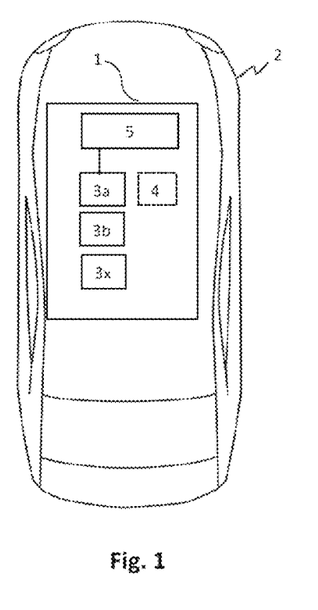
FIG. 1 is a schematic view of an apparatus for monitoring the stability of an ego vehicle.

FIG. 1 is a schematic view of an apparatus 1 for monitoring the stability of an ego vehicle 2. The apparatus 1 comprises at least a first and a second driver assistance device 3*a*, 3*b*, 3*x*, which are designed to perform automated guidance of the ego vehicle 2.

Furthermore, the apparatus 1 comprises an evaluation unit 4 which is designed to determine a degree of risk of a detected and/or anticipated pendulum motion of the ego vehicle 2.

In particular, the apparatus 1 comprises a control device which is designed to control the at least first and second driver assistance devices 3*a*, 3*b*, 3*x* for automated guidance of the ego vehicle 2. Preferably, the control device is designed to perform an assessed ego trajectory for automated guidance of the ego vehicle 2.

Furthermore, the apparatus 1 comprises an assessment unit 5 which is designed to assess, on the basis of the determined degree of risk, whether the at least first and/or second driver assistance device 3*a*, 3*b*, 3*x* in an active state will lead to pendulum initiation or pendulum intensification of the ego vehicle 2. In particular, if pendulum initiation or pendulum intensification is determined, the automated guidance is to be adjusted, in particular by deactivating or suppressing at least one driver assistance device such that critical vehicle instability, such as a rocking or even a rollover of the ego vehicle, are avoided. In particular, the degree of risk represents the potential of risk of pendulum motions on the basis of current environmental and vehicle conditions.

Figure 2:
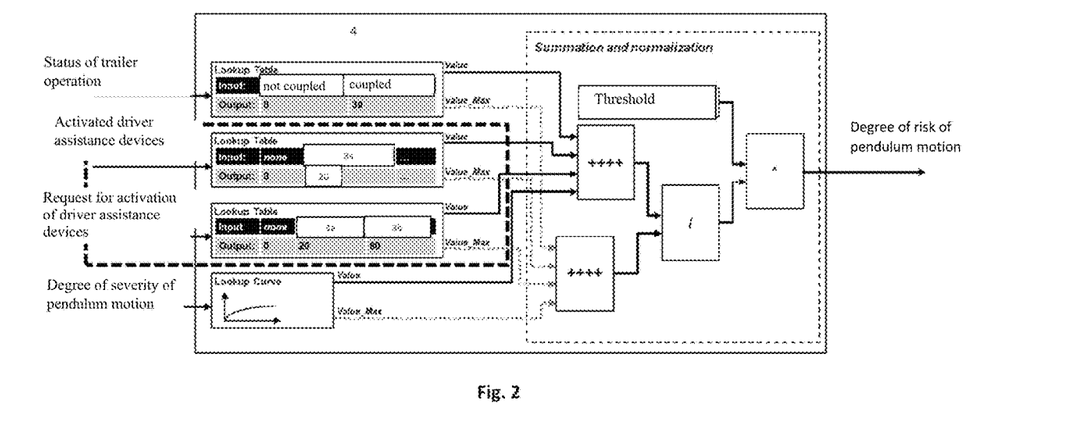
FIG. 2 shows an example embodiment for determining a degree of risk of a detected and/or anticipated pendulum motion of the ego vehicle.

FIG. 2 shows an example embodiment for determining a degree of risk of a detected and/or anticipated pendulum motion of the ego vehicle 2.

The schematically shown evaluation unit 4 is designed to assess the degree of risk of a detected and/or anticipated pendulum motion of the ego vehicle 2 on the basis of factors influencing the pendulum behavior. The influencing factors have, for example, a weighting factor which reflects the influence of the particular influencing factor on the pendulum behavior. In this context, the weighting factors describe the influence ratio of the particular influencing factor on pendulum initiation or pendulum intensification. In order to determine the degree of risk, the evaluation unit is designed in particular to perform a weighted combination of the assessed influencing factors. For example, the factors influencing the degree of risk are stored in at least one lookup table, together with the assigned weighting factors. Therefore, the evaluation unit 4 is used in particular to check, taking into account the influencing factors, whether automated guidance of the ego vehicle can be performed safely or critically influences the pendulum behavior of the ego vehicle.

For example, in order to determine the degree of risk, the at least first and second driver assistance devices 3*a*, 3*b* form one influencing factor. However, it may equally be provided that the at least first and second driver assistance devices 3a, 3b, 3x each, i.e. independently of one another, form an influencing factor.

In this embodiment, the available driver assistance devices are summarized in a lookup table. The first and second driver assistance devices 3a, 3b have different weighting factors in this case. For example, the first driver assistance device is a comfort-based driver assistance device, and the second driver assistance device is a lateral safety-based driver assistance device. The weighting factors of the influencing factors are chosen between 0 and 100, purely by way of example. If no driver assistance device 3a, 3b, 3x is activated, the weighting factor for the available driver assistance devices is 0 accordingly. A comfort-based driver assistance device 3a, such as a lane keeping assistance device, has comparatively little influence on the lateral guidance behavior and thus on the pendulum behavior. Thus, if the comfort-based driver assistance device 3a is activated or activation is requested, the degree of risk for this driver assistance device 3a is evaluated to have a comparatively low value, in this case 20. If a lateral safety-based driver assistance device 3b, such as an emergency steering assist system, is then also requested or is to take over the guidance, the degree of risk for this driver assistance device 3b is evaluated to be 60, for example, due to its influence on the lateral guidance. In this way, it is reliably determined whether it is safe to activate one or both of the driver assistance devices 3a, 3b or whether downgrading should be required.

Purely by way of example, other influencing factors are shown, such as the status of a trailer operation and a determined degree of severity of a current pendulum motion. If, for example, a pendulum motion is detected, additional activation of, for example, the safety-activated driver assistance device 3b often leads to intensification of the vehicle pendulum behavior.

In particular, if the assessed degree of risk based on the weighting factors of the influencing factors exceeds a specified threshold, a destabilization risk of the ego vehicle 2 is assessed and the automated guidance of the ego vehicle 2 is adjusted or suppressed. In this way, situation-adapted guidance of the ego vehicle and thus a risk of instability can be prevented or at least reduced.

Other influencing factors include, for example: driver alertness, driver hands-on/off detection on the steering wheel, environmental conditions such as cornering, coefficient of friction, crosswind, vehicle dynamics data such as the yaw rate, state of maintenance of the ego vehicle, characteristics of a coupled trailer such as weight, size or load distribution. These are reliable measures which, especially when aggregated, allow conclusions to be drawn about the degree of risk.

Figure 3:
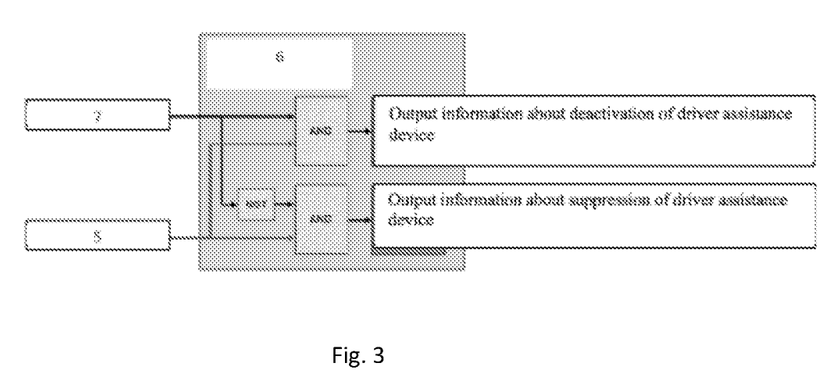
FIG. 3 shows a user interface of the apparatus from FIG. 1 for outputting information to the driver about imminent deactivation or non-availability of at least one driver assistance device.

If the operation of the at least first and/or second driver assistance device 3a, 3b, 3x in an active state will result in pendulum initiation or pendulum intensification of the ego vehicle and downgrading has been initiated, this may come as a surprise to the vehicle driver. The higher the degree of active automation, the more safety-critical the downgrading of automated guidance. With this in mind, the apparatus 1 comprises, for example, a user interface 6, as shown schematically in FIG. 3. If pendulum initiation or pendulum intensification of the ego vehicle 2 has been evaluated in case of activity or activation of the at least first and/or second driver assistance device 3a, 3b, 3x, the user interface 6 is designed, for example, to inform the driver about imminent deactivation or non-availability of the corresponding driver assistance device 3a, 3b, 3x. If, for example, an automated guidance system, in particular at least one driver assistance device 3a, 3b, 3x, is currently being controlled by the control device 7, and the assessment unit 5 has detected that downgrading is necessary, the user interface 6 is in particular designed to inform the driver of imminent or completed deactivation and/or to request that the driver take over the driving task. The information about the deactivation or non-availability can, for example, be signaled acoustically by loudspeakers and/or visually on a screen of the ego vehicle. In this way, the driver is appropriately informed of the occurrence of the restricted degree of automated assistance.

Figure 4:
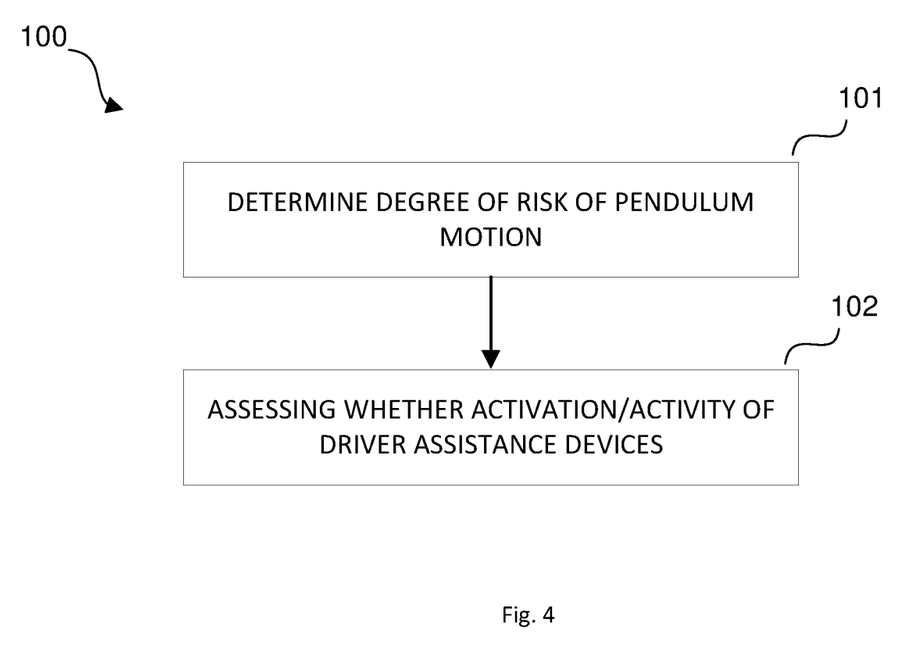
FIG. 4 shows a flowchart of the method according to the invention.

FIG. 4 shows a flowchart of the method 100 for monitoring the stability of an ego vehicle 2, comprising the following steps: determining a degree of risk of a detected and/or anticipated pendulum motion of the ego vehicle 101, and assessing, on the basis of the determined degree of risk 102, whether activation and/or activity of at least the first and/or second driver assistance device 3a, 3b, 3x of the ego vehicle 2 will lead to pendulum initiation or pendulum intensification of the ego vehicle 2.

The invention claimed is:

1. An apparatus for monitoring and controlling the stability of an ego vehicle, comprising
at least one processor circuit configured to
determine a degree of risk of at least one of a detected or anticipated pendulum motion of the ego vehicle, and
assess, on the basis of the determined degree of risk, whether a first driver assistance device in an active state will lead to at least one of pendulum initiation or pendulum intensification of the ego vehicle, each of the first driver assistance device and the second driver assistance device is configured to guide the ego vehicle and executed by the at least one processor circuit,
wherein the at least one processor circuit is further configured to suppress activation of the first driver assistance device if the determined degree of risk exceeds a preset threshold,
wherein the first driver assistance device is a lateral safety-based driver assistance device, and the second driver assistance device is a comfort-based driver assistance device,
wherein the lateral safety-based driver assistance device comprises a collision avoidance protection device for preventing collisions with obstacles or a lane departure protection device for preventing departure from a lane or road in which the ego vehicle is disposed,
wherein the degree of risk is determined on the basis of assessed factors influencing the pendulum motion of the ego vehicle, a weighting factor being assigned to each of the factors influencing the degree of risk, each weighting factor reflecting an influence of the assessed factor assigned thereto on the pendulum motion, and the at least one processor circuit is configured to perform a weighted combination of the assessed influencing factors in order to determine the degree of risk,
wherein each of the first driver assistance device and the second driver assistance device is an influencing factors for determining the degree of risk and each of the first driver assistance device and the second driver assistance device has an assigned weighting factor.

2. The apparatus according to claim 1, wherein a higher weighting factor is assigned to the first driver assistance device than the weighting factor assigned to the second driver assistance device.

3. The apparatus according to claim 1, wherein the comfort-based driver assistance device comprises a traffic jam assistance device or an adaptive cruise control system.

4. The apparatus according to claim 1, wherein the at least one processor circuit is configured to determine the degree of risk of at least one of imminent pendulum initiation or pendulum intensification on the basis of at least one of a currently detected vibration level of a coupled trailer or a loaded state of the coupled trailer.

5. The apparatus according to claim 1, wherein the at least one processor circuit is configured to determine the degree of risk of at least one of imminent pendulum initiation or pendulum intensification on the basis of driver alertness.

6. The apparatus according to claim 1, wherein the at least one processor circuit is configured to determine the degree of risk on the basis of at least one of precipitation conditions, wind conditions, visibility conditions, or a coefficient of friction.

7. The apparatus according to claim 1, wherein the at least one processor circuit is configured to detect a degree of severity of a pendulum motion of the ego vehicle, the at least one processor circuit being configured to perform assessment of at least one of pendulum initiation or pendulum intensification in the case of an activated state of the first driver assistance device and the second driver assistance device additionally on the basis of the detected degree of severity.

8. The apparatus according to claim 1, further comprising a user interface which is configured to inform a driver of the ego vehicle about imminent non-availability of the lateral driver assistance device for automated lateral guidance if at least one of the activation or activity thereof will lead to the at least one of pendulum initiation or pendulum intensification of the ego vehicle, in particular to the preset threshold being exceeded.

9. A vehicle comprising an apparatus according to claim 1.

10. The apparatus according to claim 1, wherein the preset threshold corresponds to pendulum motion of the ego vehicle which would no longer be compensated for or is intensified by the lateral safety-based driver assistance device.

11. The apparatus according to claim 1, wherein during a time when activation or continued activation of the first driver assistance device and the second driver assistance device is requested, the first driver assistance device as weighted by the weighting factor assigned thereto, and the second driver assistance device as weighted by the weighting factor assigned thereto, are considered by the at least one processor circuit individually and combined as the weighted combination relative to the preset threshold in determining that the at least one first driver assistance device is to be suppressed.

12. The apparatus according to claim 1, wherein the at least one processor circuit is further configured to assess whether a third driver assistance device of the vehicle in an active state will lead to the at least one of pendulum initiation or pendulum intensification of the ego vehicle, and activate the third driver assistance device if the determined degree of risk associated with activation of the third driver assistance device does not exceed the preset threshold.

13. A method for monitoring and controlling stability of an ego vehicle, comprising:
determining, by at least one processor circuit, a degree of risk of at least one of a detected or an anticipated pendulum motion of the ego vehicle; and assessing, by the at least one processor circuit on the basis of the determined degree of risk, whether at least one of activation or activity of a first driver assistance device and a second driver assistance device of the ego vehicle will lead to the at least one of pendulum initiation or pendulum intensification of the ego vehicle, each of the first driver assistance device and the second driver assistance device is configured to at least partly guide the ego vehicle and executed by the at least one processor circuit, wherein the degree of risk is determined on the basis of assessed factors influencing the pendulum motion of the ego vehicle, a weighting factor being assigned to each of the factors influencing the degree of risk, each weighting factor reflecting an influence of the assessed factor assigned thereto on the pendulum motion, and the at least one processor circuit is configured to perform a weighted combination of the assessed influencing factors in order to determine the degree of risk, wherein the first driver assistance device is a lateral safety-based driver assistance device, and the second driver assistance device is a comfort-based driver assistance device, wherein the lateral safety-based driver assistance device comprises a collision avoidance protection device for preventing collisions with obstacles or a lane departure protection device for preventing departure from a lane or road in which the ego vehicle is disposed, wherein each of the lateral safety-based driver assistance device and the comfort-based driver assistance device is an influencing factor for determining the degree of risk, with the lateral safety-based driver assistance device having a higher risk of destabilizing the vehicle than the comfort-based driver assistance device and having a higher weighting factor than the weighting factor for the comfort-based driver assistance device, each of the lateral safety-based driver assistance device and the comfort-based driver assistance device has a different assigned weighting factor.

14. The apparatus according to claim 1, wherein, if a traffic risk is determined, the at least one processor circuit is configured to deactivate the at least one comfort-based driver assistance device in the activated state and to activate the at least one lateral safety-based driver assistance device if the at least one lateral safety-based driver assistance device is capable of reducing the determined traffic risk, and the at least one processor circuit is configured to suppress the activation of the lateral safety-based driver assistance device in spite of the determined traffic risk if the assessed degree of risk exceeds a defined threshold in the case of an activated lateral safety-based driver assistance device.

15. The method according to claim 13, wherein the method further comprises suppressing activation, by the at least one processor circuit, of the lateral safety-based driver assistance device if the determined degree of risk exceeds a preset threshold with the lateral safety-based driver assistance device activated.

16. The method according to claim 15, further comprising outputting, by the at least one processor, information to an operator of the vehicle that the activation suppression of the lateral safety-based driver assistance device is imminent.

17. A method for monitoring and controlling a stability of an ego vehicle, comprising:
determining, by at least one processor circuit, a degree of risk of at least one of a detected or an anticipated pendulum motion of the ego vehicle; and assessing, by the at least one processor on the basis of the determined degree of risk, whether at least one of activation or activity of at least one of a first driver assistance device or a second driver assistance device of the ego vehicle will lead to at least one of pendulum initiation or pendulum intensification of the ego vehicle, each of the first driver assistance device and the second driver assistance device is configured to guide the ego vehicle and executed by the at least one processor circuit, wherein the first driver assistance device is a lateral safety-based driver assistance device, and the second driver assistance device is a comfort-based driver assistance device, wherein the lateral safety-based driver assistance device comprises a collision avoidance protection device for preventing collisions with obstacles or a lane departure protection device for preventing departure from a lane or road in which the ego vehicle is disposed, wherein the comfort-based driver assistance device comprises a lane keeping assistance device, a lane change assistance device, or a traffic jam assistance device, and wherein the at least one processor circuit is further configured to suppress activation of the lateral safety-based driver assistance device if the determined degree of risk exceeds a preset threshold with the lateral safety-based driver assistance device activated, and wherein the degree of risk is determined on the basis of assessed factors influencing the pendulum motion of the ego vehicle, a weighting factor being assigned to each of the factors influencing the degree of risk, each weighting factor reflecting an influence of the assessed factor assigned thereto on the pendulum motion, and the at least one processor circuit configured to perform a weighted combination of the assessed influencing factors in order to determine the degree of risk, wherein each of the at least one first driver assistance device or the second driver assistance devices is an influencing factor for determining the degree of risk, with each of the first driver assistance device and the second driver assistance device having an assigned weighting factor.

18. The method according to claim 17, wherein the lateral safety-based driver assistance device has a higher risk of destabilizing the vehicle than the comfort-based driver assistance device and having a higher weighting factor than the weighting factor for the comfort-based driver assistance device.

19. The method according to claim 17, wherein the at least one processor circuit is further configured to assess whether a third driver assistance device of the vehicle in an active state will lead to the at least one of pendulum initiation or pendulum intensification of the ego vehicle, and activate the third driver assistance device if the determined degree of risk associated with activation of the third driver assistance device does not exceed the preset threshold.

* * * * *